US008581901B2

(12) United States Patent
Joshi

(10) Patent No.: US 8,581,901 B2
(45) Date of Patent: Nov. 12, 2013

(54) METHODS AND APPARATUS FOR INTERACTIVE ROTATION OF 3D OBJECTS USING MULTITOUCH GESTURES

(75) Inventor: Pushkar P. Joshi, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 154 days.

(21) Appl. No.: 13/193,314

(22) Filed: Jul. 28, 2011

(65) Prior Publication Data

US 2013/0127825 A1 May 23, 2013

(51) Int. Cl.
*G06T 15/00* (2011.01)
*G06K 9/36* (2006.01)
(52) U.S. Cl.
USPC ............................................ 345/419; 382/285
(58) Field of Classification Search
USPC .................................................... 345/419
See application file for complete search history.

(56) References Cited

U.S. PATENT DOCUMENTS

| 8,269,729 | B2 * | 9/2012 | Han et al. | 345/173 |
|---|---|---|---|---|
| 8,289,316 | B1 * | 10/2012 | Reisman et al. | 345/419 |
| 8,325,181 | B1 * | 12/2012 | Reisman et al. | 345/419 |
| 8,407,606 | B1 * | 3/2013 | Davidson et al. | 715/754 |
| 2010/0079493 | A1 * | 4/2010 | Tse et al. | 345/650 |
| 2011/0041098 | A1 * | 2/2011 | Kajiya et al. | 715/849 |
| 2012/0249430 | A1 * | 10/2012 | Oster et al. | 345/173 |

OTHER PUBLICATIONS

Chen, Mountford, Allen: A study in interactive 3D rotation using 2D control devices. Computer Graphics 22 (4) (1988) 121-129.
Shoemake, K.: ARCBALL: A user interface for specifying three-dimensional orientation using a mouse. Proc. of Graphics Interface (1992) 151-156.
Jason L. Reisman, Philip L. Davidson, Jefferson Y. Han: A screen-space formulation for 2D and 3D direct manipulation. UIST 2009: 69-78.
Ragnar Bade, Felix Ritter, and Bernhard Preim: Usability Comparison of Mouse-based Interaction Techniques for Predictable 3d Rotation. Smart Graphics, pp. 138-150, 2005.
Mark Hancock, Sheelagh Carpendale, Andrew Cockburn: Shallow-Depth 3D Interaction: Design and Evaluation of One-, Two- and Three-Touch Techniques. In Proc. CHI 2007, pp. 1147-1156, 2007.

* cited by examiner

*Primary Examiner* — Kee M Tung
*Assistant Examiner* — Richard M Russell
(74) *Attorney, Agent, or Firm* — Wolfe-SBMC

(57) ABSTRACT

Methods and apparatus for interactively rotating three-dimensional (3D) objects using multitouch gestures. To perform a roll gesture, multiple touch points are detected on a multitouch-enabled device. The touch points are associated with, or select, a 3D object displayed on the device. The centroid of the touch points is computed, and motion of the centroid, resulting from motion of the touch points, is tracked. When motion of the centroid is detected, a displacement is obtained, and the displacement is mapped to a rotation transformation. The 3D object may then be rotated according to the rotation transformation, and a 2D projection of the rotated 3D object is displayed. If the number of touch points changes, rotation may be reset without rotating the object. Alternatively, displacement from the previous centroid to the new centroid is determined and the object is rotated accordingly.

20 Claims, 12 Drawing Sheets

METHODS AND APPARATUS FOR INTERACTIVE ROTATION OF 3D OBJECTS USING MULTITOUCH GESTURES

BACKGROUND

Description of the Related Art

Conventional touch-enabled technologies (e.g. a computer touchpad, ATM screen, etc) recognize only one touch point. Multitouch is a technology that provides hardware and software that allows computer users to control various applications via the manipulation of multiple digits on the surface of (or, for some devices, proximate to) a multitouch-enabled device. Multitouch technology generally consists of a touch-enabled device (referred to as a multitouch device) such as a touch-sensitive display device (computer display, screen, table, wall, etc.), touchpad, tablet, etc., as well as software that recognizes multiple, substantially simultaneous touch points on the surface of the multitouch device. A multitouch device may be a direct or absolute touch device in which the touch points are applied directly to a display device, or an indirect or relative touch device in which the touch points are applied to a pad or tablet and mapped to a display device.

SUMMARY

Various embodiments of methods and apparatus for interactively rotating three-dimensional (3D) graphical objects using multitouch gestures are described. In embodiments, a 3D object may be rotated according to displacement of the centroid (the mean position) of multiple (two or more) touch points on a touch-sensitive surface of a multitouch device. In embodiments, to perform a roll gesture, multiple touch points are detected on the touch-sensitive surface. The multiple touch points are associated with, or select, a 3D object displayed on the screen. The centroid (mean position) of all the touch points is computed. Motion of the centroid, resulting from motion of the touch points on the touch-sensitive surface, is tracked. When motion of the centroid is detected, a displacement is obtained. The displacement of the centroid is mapped to a rotation transformation. The 3D object may then be rotated according to the rotation transformation, and a 2D projection of the rotated 3D object is displayed.

In at least some embodiments, a rotation transformation may indicate at least an axis of rotation, a direction of rotation, and an angle of rotation for the 3D object, all determined from the displacement of the centroid position. In at least some embodiments, the axis of rotation lies on the plane corresponding to the screen, and the angle of rotation indicates how far the 3D object is to be rotated about the axis in the direction of rotation. In at least some embodiments, the 3D object may be rotated about the axis of rotation in the direction of rotation by an amount indicated by the angle of rotation.

In at least some embodiments, if the number of touch points changes (i.e., if one or more new touch points are detected or one or more touch points are removed), rotation may be reset (e.g., by setting displacement to 0), a new centroid is determined, and displacement of the centroid may be tracked from the new location of the centroid. As an alternative, in at least some embodiments, if the number of touch points changes, a new centroid is determined, a displacement from the previous centroid to the new centroid is determined, the displacement is mapped to a rotation transformation, and the 3D object may then be rotated according to the rotation transformation. A 2D projection of the rotated 3D object is then displayed. This allows the user to place one or more additional digits on or remove one or more digits from the touch-sensitive surface to cause a rotation of the 3D object accordingly.

In at least some embodiments, the above two modes or methods for handling addition or removal of digits from the touch-sensitive surface may be provided as user-selectable options.

The roll gestures as described herein may be performed using multiple digits of a single hand to specify and move touch points, or by using one or more digits on both hands to specify and move touch points. In addition, one or more digits of one hand may be used to specify one or more touch points, and another touch point may be specified using a stylus, pen, or cursor control device controlled or operated by the other hand.

While the above describes the roll gesture being used to rotate a 3D object, in at least some embodiments the roll gesture may be used to select and simultaneously rotate a group of two or more 3D objects displayed on the screen.

Figure 1A:
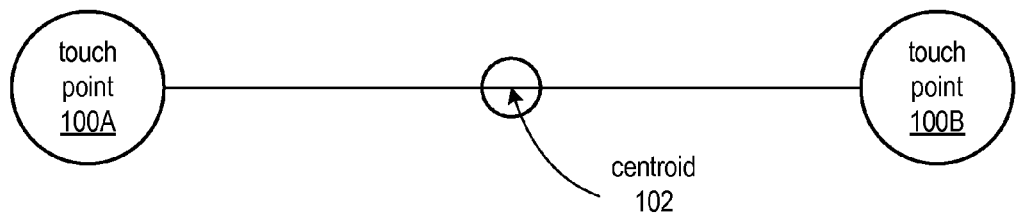
FIGS. 1A through 1C illustrate a roll gesture using two digits or touch points, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for interactively rotating three-dimensional (3D) graphical objects using multitouch gestures are described. Using multitouch gestures as described herein, a 3D object may be rotated according to displacement of the centroid (the mean position) of multiple (two or more) touch points on a touch-sensitive surface of a multitouch device. The multitouch device may be a direct or absolute touch device in which the touch points are applied directly to a screen on which one or more 3D objects are displayed, or an indirect or relative touch device in which the touch points are applied to a pad or tablet and mapped to a screen on which one or more 3D objects are displayed. These multitouch gestures may be referred to as roll gestures.

In embodiments, to perform a roll gesture, multiple touch points are detected on the touch-sensitive surface. The multiple touch points are associated with, or select, a 3D object displayed on the screen. Note that the 3D object is displayed as a two-dimensional (2D) projection on a plane corresponding to the screen. The centroid (mean position) of all the touch points is computed. Motion of the centroid, resulting from motion of the touch points on the touch-sensitive surface, is tracked. When motion of the centroid is detected, a displacement is obtained. In at least some embodiments, the displacement may be a vector defined by the original centroid and the detected movement, and thus may include direction and magnitude information. The displacement of the centroid is mapped to a rotation transformation. The 3D object may then be rotated according to the rotation transformation, and a 2D projection of the rotated 3D object is displayed. In at least some embodiments, a rotation transformation may indicate at least an axis of rotation, a direction of rotation, and an angle of rotation for the 3D object, all determined from the displacement of the centroid position. In at least some embodiments, the axis of rotation lies on the plane corresponding to the screen, and the angle of rotation indicates how far the 3D object is to be rotated about the axis in the direction of rotation. In at least some embodiments, the 3D object may be rotated about the axis of rotation in the direction of rotation by an amount indicated by the angle of rotation.

In at least some embodiments, if the number of touch points changes (i.e., if one or more new touch points are detected or one or more touch points are removed), rotation may be reset (e.g., by setting displacement to 0), a new centroid is determined, and displacement of the centroid may be tracked from the new location of the centroid. This allows the user to place one or more additional digits on or remove one or more digits from the touch-sensitive surface without causing the 3D object to rotate. As an alternative, in at least some embodiments, if the number of touch points changes, a new centroid is determined, a displacement from the previous centroid to the new centroid is determined, the displacement is mapped to a rotation transformation, and the 3D object may then be rotated according to the rotation transformation. A 2D projection of the rotated 3D object is then displayed. This allows the user to place one or more additional digits on or remove one or more digits from the touch-sensitive surface to cause a rotation of the 3D object accordingly. This technique may, for example, allow the user to toggle to different rotated views of the 3D object by placing an additional digit on the surface and then removing the digit from the surface, each action producing a relatively large rotation, and the two actions producing rotations in the opposite direction about the same axis.

In at least some embodiments, the above two modes or methods for handling addition or removal of digits from the touch-sensitive surface may be provided as user-selectable options.

While the above describes the roll gesture being used to rotate a 3D object, in at least some embodiments the roll gesture may be used to select and simultaneously rotate a group of two or more 3D objects displayed on the screen.

Using embodiments of the multitouch roll gestures as described herein, users can control the rotation of 3D objects using multiple digits that are touching the screen, which is powerful and intuitive. Tracking a centroid position for multiple touch points and using centroid displacement to control 3D rotation as described herein is computationally relatively inexpensive when compared to conventional multi-point 3D rotation techniques, and is not significantly more expensive than conventional single-point 3D rotation techniques. Using the reset rotation mode for handling addition or removal of touch points, there is no rotation when the user add a new touch point or removes an existing touch point. However, in at least some embodiments, users may optionally select to apply rotation when adding or removing touch points, thus effecting a relatively large but intuitive rotation by adding or removing touch points.

Using embodiments of the multitouch roll gestures as described herein, users may apply a variety of multitouch roll gesture techniques or combinations, or even experiment and create their own gestures or techniques. For example a user may roll a 3D object with two or more touches by keeping one or more touch points stationary and moving one or more other touch points towards or away from the stationary touch point (s), without needing any extra gesture identification functionality. As another example, a user may place two or more touch points and rapidly sweep all the touch points across the surface to create a spin effect. Other examples of different forms or techniques of the roll gesture that may be used are described elsewhere herein.

Figure 1B:
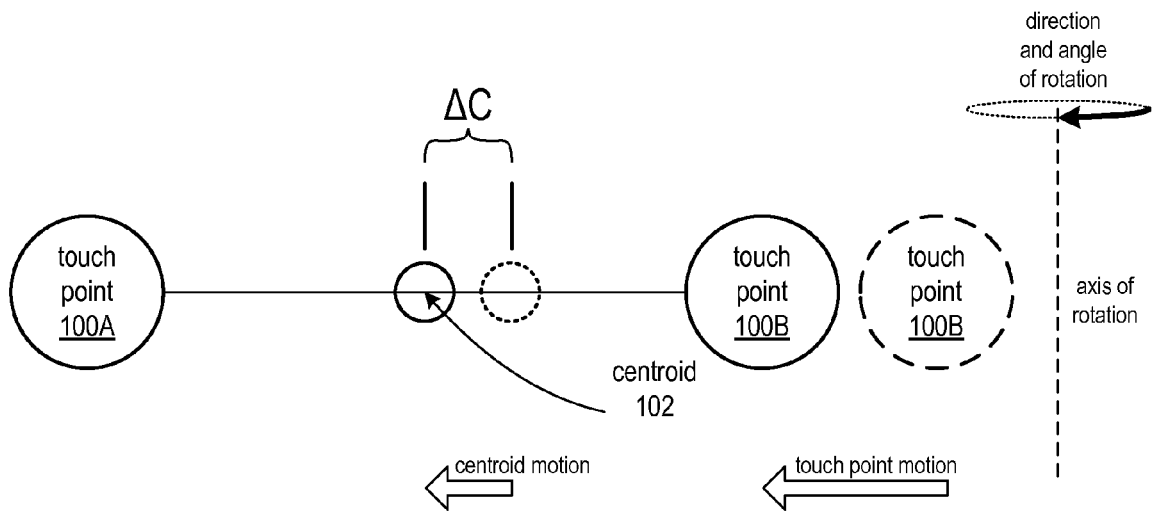
Figure 1C:
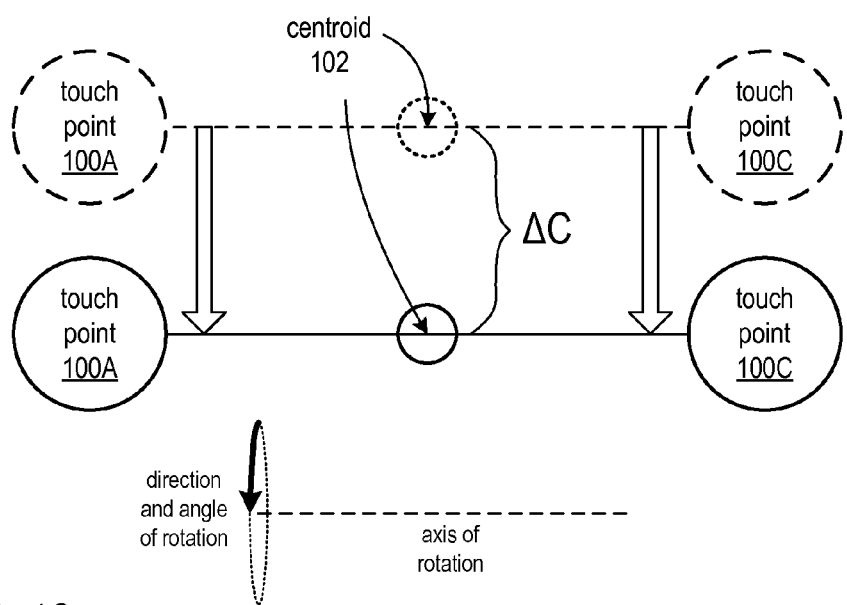

FIGS. 1A through 1C illustrate a roll gesture using two digits or touch points, according to at least some embodiments. In FIG. 1A, two touch points 100A and 100B are detected. The position of the centroid 102 of the two touch points 100A and 100B is tracked. As illustrated in FIG. 1B, if touch point 100A is held stationary and touch point 100B is moved towards touch point 100A, a change in the centroid 102 position, ΔC, is obtained. This displacement ΔC may then be used to perform a rotation of a corresponding 3D object on the display. In at least some embodiments, the rotation of the 3D object may be performed by a rotation engine or method. Any of various rotation engines or methods may be used to perform the rotation of the 3D object in various embodiments. The rotated 3D object is then displayed on the screen.

Figure 10:
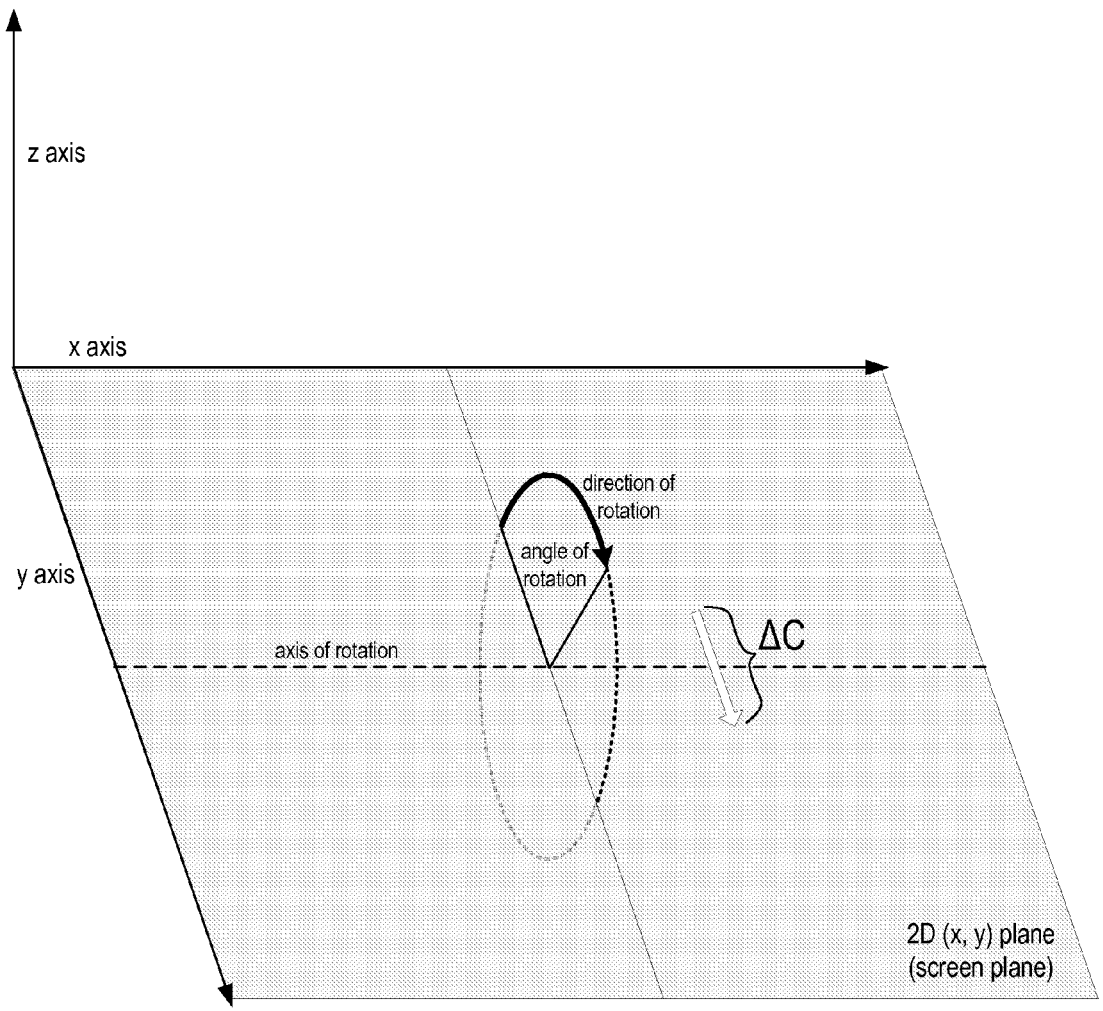
FIG. 10 graphically illustrates a rotation transformation for a 3D object relative to the display screen plane, according to at least some embodiments.

In at least some embodiments, the displacement of the centroid 102 is mapped to a rotation transformation. The 3D object may then be rotated by the rotation engine or method according to the rotation transformation, and a 2D projection of the rotated 3D object may be displayed. In at least some embodiments, a rotation transformation may indicate at least an axis of rotation, a direction of rotation, and an angle of rotation for the 3D object as shown on the right of FIG. 1B, all determined from the displacement of the centroid 102 position. FIG. 10 graphically illustrates a rotation transformation for a 3D object relative to the display screen plane, according to at least some embodiments. As illustrated in FIG. 10, in at least some embodiments, the axis of rotation lies on the plane corresponding to the display screen, and the angle of rotation indicates how far the 3D object is to be rotated about the axis. In at least some embodiments, the 3D object may be rotated about the axis of rotation in the direction of rotation by an amount indicated by the angle of rotation.

As illustrated in FIG. 1C, if both touch point 100A and touch point 100B are moved, a change in the centroid 102 position, ΔC, is obtained. This displacement ΔC may then be used to perform a rotation of the respective 3D object on the display, as described above in relation to FIG. 1B. The axis of rotation, direction of rotation, and angle of rotation for the 3D object are shown at the bottom of FIG. 1C.

In at least some embodiments, the motion of the centroid 102 may be substantially continuously tracked, motion detected, displacement ΔC obtained, and rotation applied accordingly. Thus, from the user's perspective, interactive rotation of the displayed 3D object may be performed.

Figure 2A:
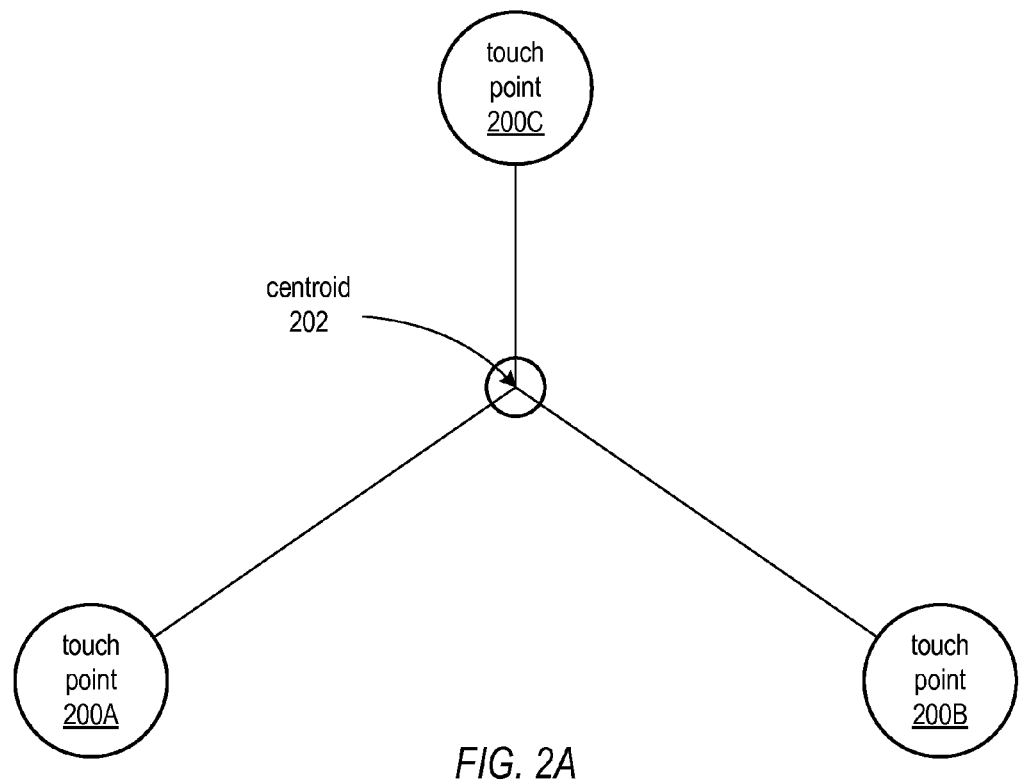
FIGS. 2A and 2B illustrate a roll gesture using three digits or touch points, according to at least some embodiments.
Figure 2B:
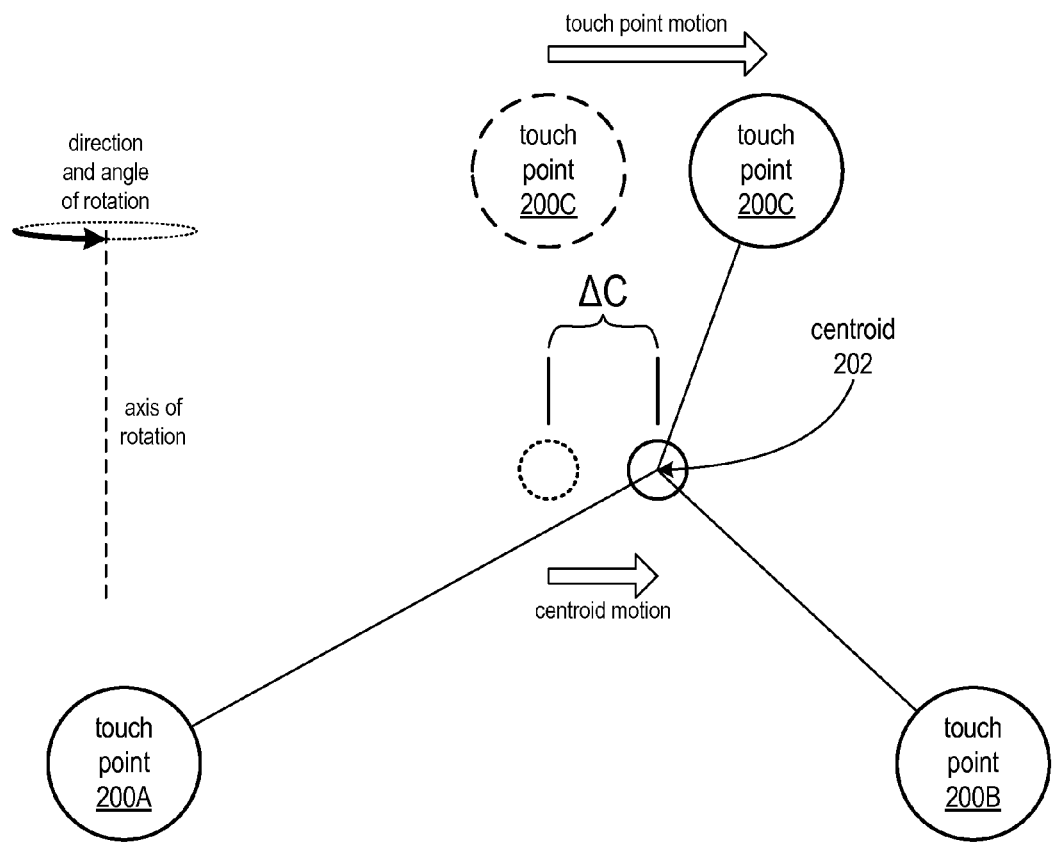

FIGS. 2A and 2B illustrate a roll gesture using three digits or touch points, according to at least some embodiments. In FIG. 2A, three touch points 200A, 200B, and 200C are detected. The position of the centroid 202 of the touch points 200 is tracked. As illustrated in FIG. 2B, if touch point 200A and 200B are held stationary and touch point 200C is moved, a change in the centroid 202 position, ΔC, is obtained. This displacement ΔC may then be used to perform a rotation of a corresponding 3D object on the display, as described above in relation to FIG. 1B. The axis of rotation, direction of rotation, and angle of rotation for the 3D object are shown at the left of FIG. 2B. Similarly, if two or all three of touch points 200 are moved, a change in the centroid 202 position, ΔC, is obtained, and the 3D object is rotated accordingly.

FIGS. 1A-1C and 2A-2B illustrate a roll gesture using two and three touch points, respectively. Note, however, that the rotation technique works with any number of touch points by tracking the change in position of the centroid of the touch points and using the displacement to perform a rotation of a respective 3D object.

Figure 3A:
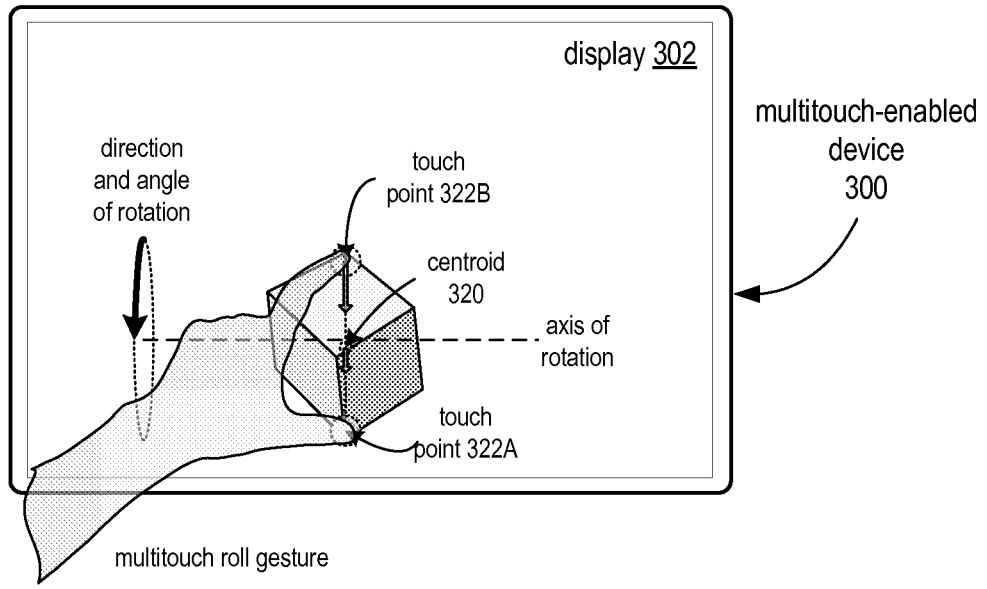
FIGS. 3A and 3B graphically illustrate using the roll gesture on a multitouch-enabled display of a device, according to at least some embodiments.
Figure 3B:
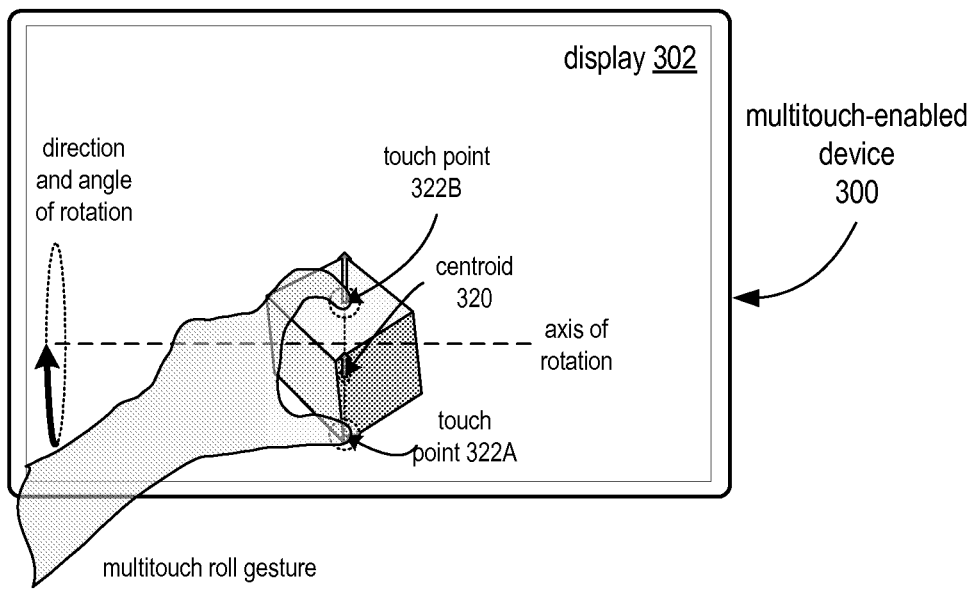
Figure 12:
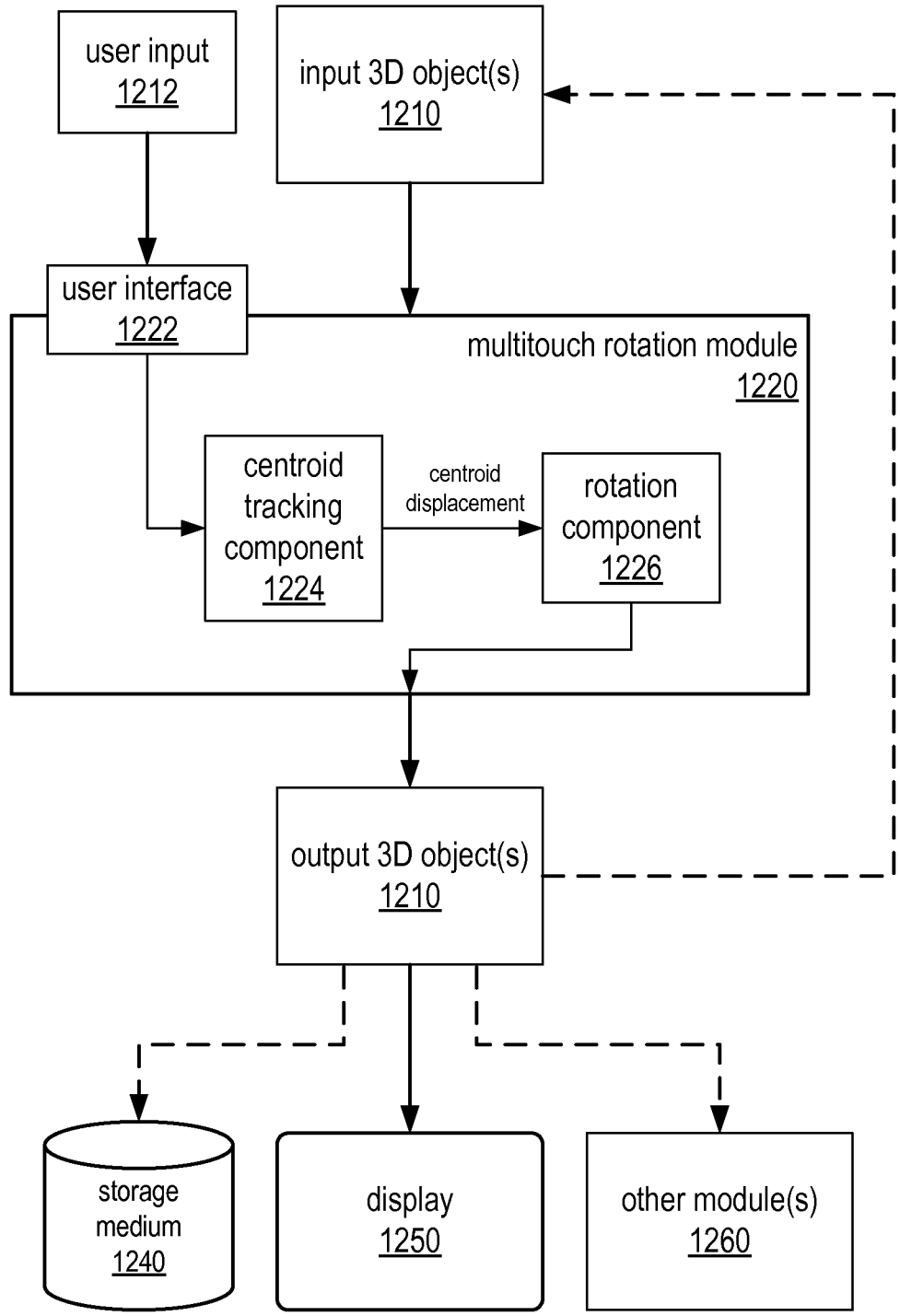
FIG. 12 illustrates a module that may implement a multitouch rotation tool, according to some embodiments.
Figure 13:
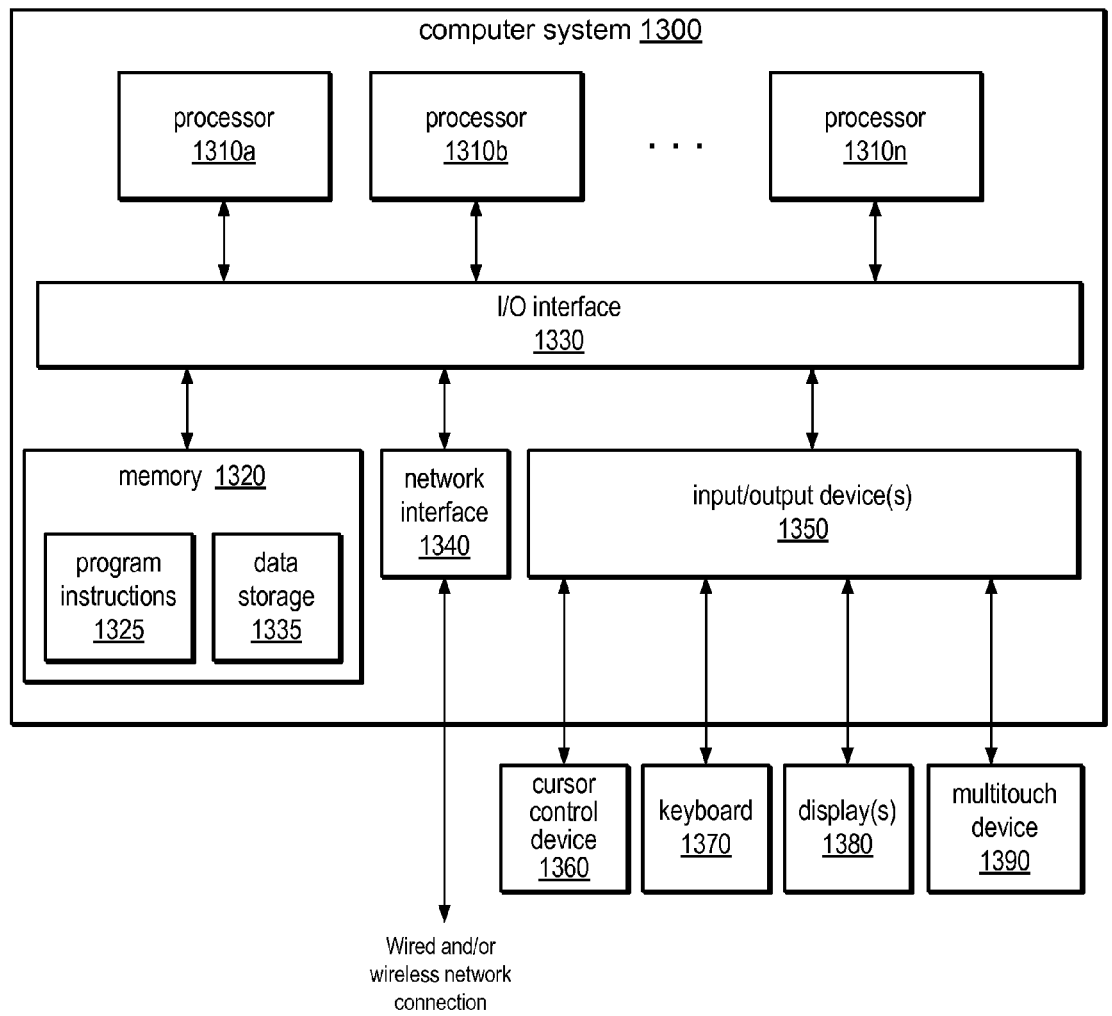
FIG. 13 illustrates an example computer system that may be used in embodiments.

FIGS. 3A and 3B graphically illustrate using the roll gesture on a multitouch-enabled display of a device, according to at least some embodiments. Multitouch-enabled device 300 may be any computing device with a multitouch-enabled display, for example a desktop, laptop, or notebook computer, a pad or notepad-type device, an e-book, a cell phone, a smart phone, a personal digital assistant (PDA), or in general computing device that may display and process 3D objects and that supports multitouch functionality via a multitouch-enabled display screen 302. The roll gesture methods as described herein may, for example, be implemented in a multitouch rotation module on multitouch-enabled device 300. An example of a multitouch rotation module is shown in FIG. 12. A system on which the roll gesture methods and/or the multitouch rotation module may be implemented is shown in FIG. 13.

As shown in FIG. 3A, the user may place two digits on (or proximate to) the display 302 of multitouch-enabled device 300 to select a 3D object or objects. Touch points 322A and 322B are detected, and a centroid 320 of the touch points 322 is determined. The centroid 320 is tracked. The user then moves one or more digits. In this example, the user only moves the digit corresponding to touch point 322B, causing touch point 322B to move and centroid 320 to be displaced accordingly. This displacement may then be used to perform a rotation of a corresponding 3D object on the display 302, as described above in relation to FIG. 1B. The axis of rotation, direction of rotation, and angle of rotation for the 3D object are shown on FIG. 3A.

As shown in FIG. 3B, the user moves the digit corresponding to touch point 322B back to near its original position as shown in FIG. 3A. Centroid 320 is displaced, and the displacement is be used to perform a rotation of a corresponding 3D object on the display 302, as described above in relation to FIG. 1B. The axis of rotation, direction of rotation, and angle of rotation for the 3D object are shown on FIG. 3B. Note that this rotation is in the opposite direction to the rotation shown in FIG. 3A.

Figure 4:
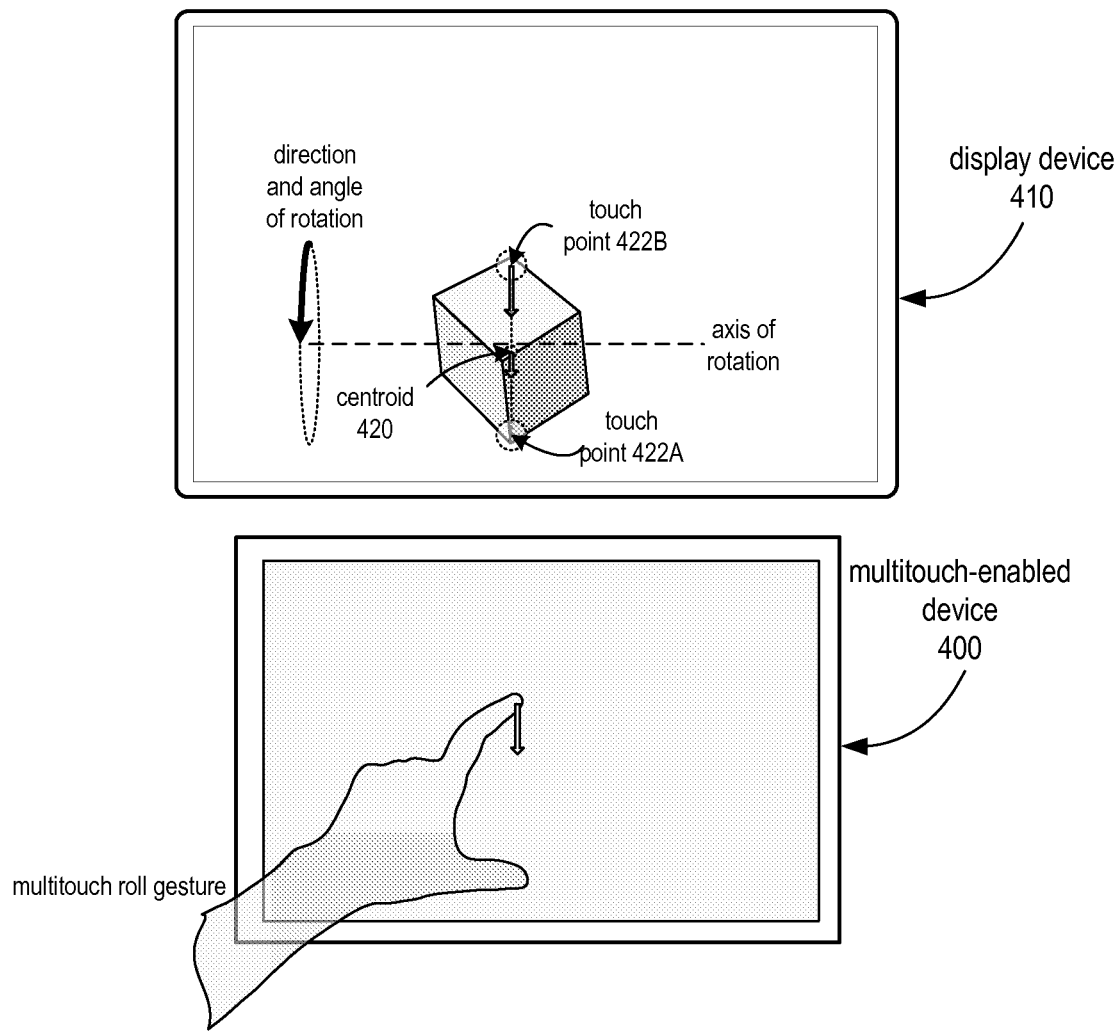
FIG. 4 graphically illustrates using the roll gesture on a relative touch device, where the gesture is performed on a touch pad or surface other than the display screen, according to at least some embodiments.

In FIGS. 3A and 3B, the example 3D object is shown displayed on a display 302 of a multitouch-enabled device 300 in which the display 302 itself is multitouch-enabled, and the roll gesture is performed on (or proximate to) the surface of the display 302. This technique may be referred to as absolute touch or direct touch. However, in some implementations, the 3D object(s) may be displayed on a display device, and the roll gestures may be performed on a separate multitouch-enabled device, such as a multitouch-enabled touchpad or tablet, as shown in FIG. 4. This technique may be referred to as relative touch or indirect touch. As shown in FIG. 4, the user may place two digits on (or proximate to) the multitouch-enabled device 400 to select a 3D object or objects. Touch points 422A and 422B are detected relative to the display, and a centroid 420 of the touch points 422 relative to the display is determined. The centroid 420 is tracked. The user may then move one or more digits, causing centroid 420 to be displaced. This displacement may then be used to perform a rotation of a corresponding 3D object on the display, as described above in relation to FIG. 1B. The axis of rotation, direction of rotation, and angle of rotation for the 3D object are shown on display device 410 in FIG. 4.

Figure 5:
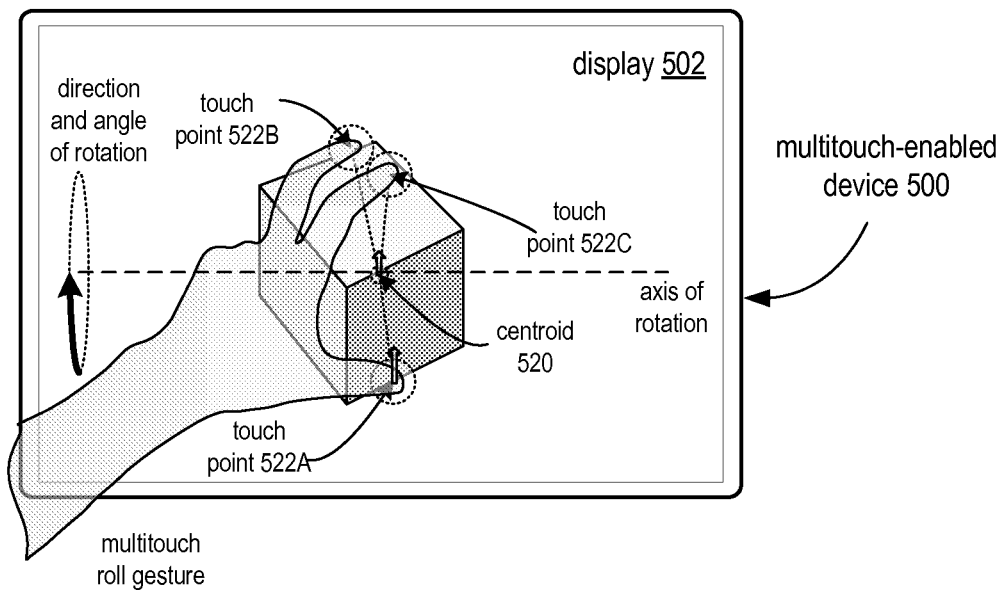
FIG. 5 graphically illustrates using three digits to perform the roll gesture on a multitouch-enabled display of a device, according to at least some embodiments.

FIG. 5 graphically illustrates using three digits to perform the roll gesture on a multitouch-enabled display of a device, according to at least some embodiments. As shown in FIG. 5, the user may place three digits on (or proximate to) the display 502 of multitouch-enabled device 500 to select a 3D object or objects. Touch points 522A, 522B, and 522C are detected, and a centroid 520 of the touch points 522 is determined. The centroid 520 is tracked. The user then moves one or more digits. In this example, the user only moves the thumb, corresponding to touch point 522A, causing touch point 522A to move and centroid 520 to be displaced accordingly. This displacement may then be used to perform a rotation of a corresponding 3D object on the display 502, as described above in relation to FIG. 1B. The axis of rotation, direction of rotation, and angle of rotation for the 3D object are shown on FIG. 5.

Figure 6:
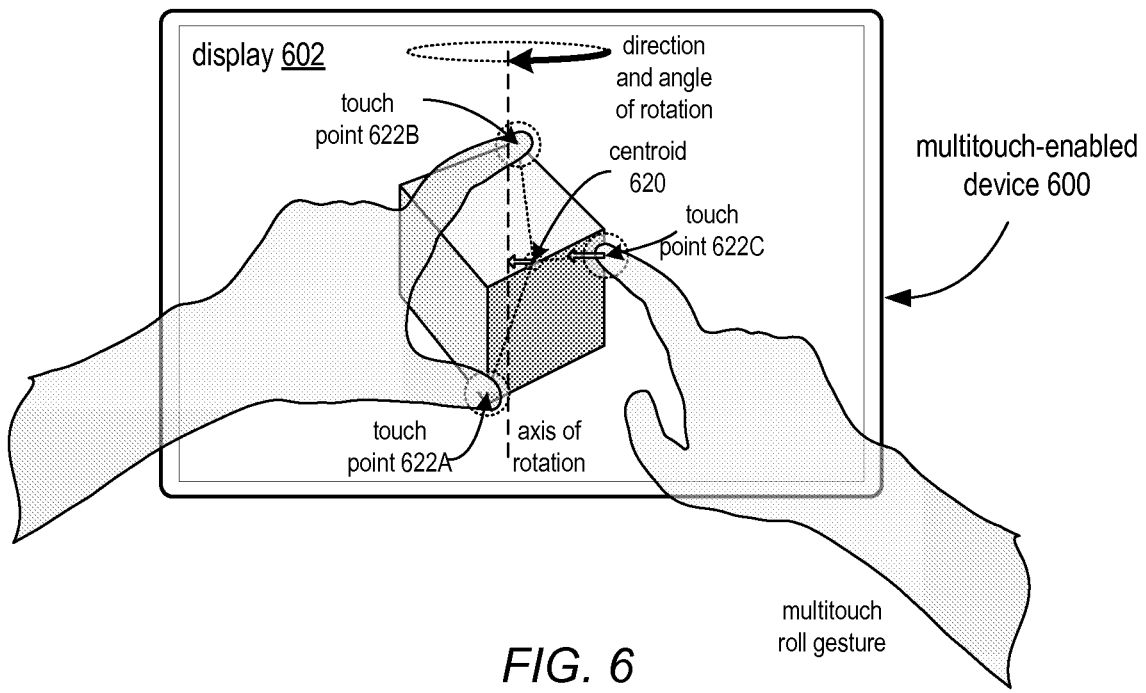
FIG. 6 graphically illustrates using digits on two hands to perform the roll gesture on a multitouch-enabled display of a device, according to at least some embodiments.

While FIGS. 3A through 5 show roll gestures being performed with a single hand, the roll gestures may be performed using digits on both hands, as illustrated in FIG. 6. As shown in FIG. 6, the user may place one or more digits of both hands on (or proximate to) the display 602 of multitouch-enabled device 600. Touch points 622A, 622B, and 622C are detected, and a centroid 620 of the touch points 622 is determined. The centroid 620 is tracked. The user then moves one or more digits. In this example, the user only moves the index finger of the right hand, corresponding to touch point 622C, causing touch point 622C to move and centroid 620 to be displaced accordingly. This displacement may then be used to perform a rotation of a corresponding 3D object on the display 602, as described above in relation to FIG. 1B. The axis of rotation, direction of rotation, and angle of rotation for the 3D object are shown on FIG. 6.

While FIG. 6 shows two hands being used, and touch point 622C corresponding to a digit of one hand, in at least some embodiments a touch point (e.g., touch point 622C) may be indicated using a stylus or pen, or a cursor control device such as a mouse or trackball, instead of a digit. In these embodiments, for example, the user may use one or more digits of one hand to indicate one or more touch points, and a stylus, pen, or cursor control device controlled by the other hand to create an additional touch point, and then rotate the 3D object by moving one or more of the touch points.

Figure 7A:
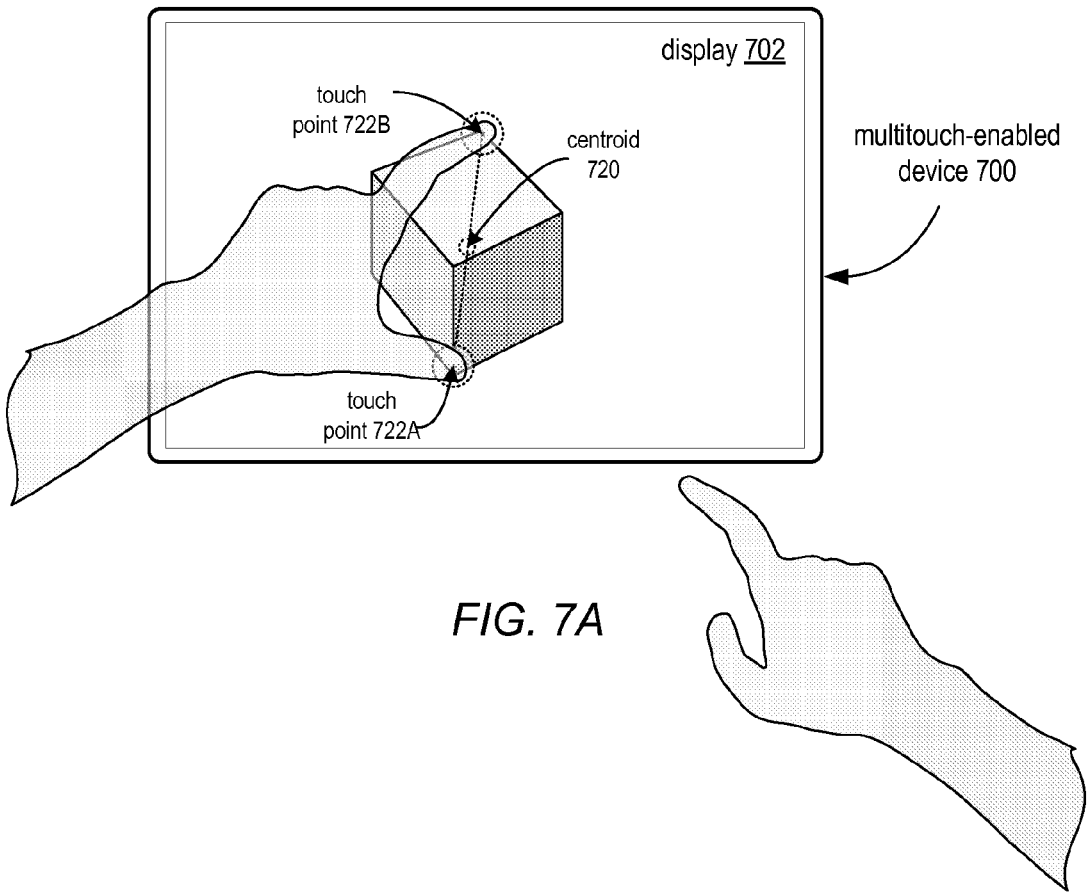
FIGS. 7A and 7B graphically illustrate an example in which an additional digit (and thus an additional touch point) is added, according to at least some embodiments.
Figure 7B:
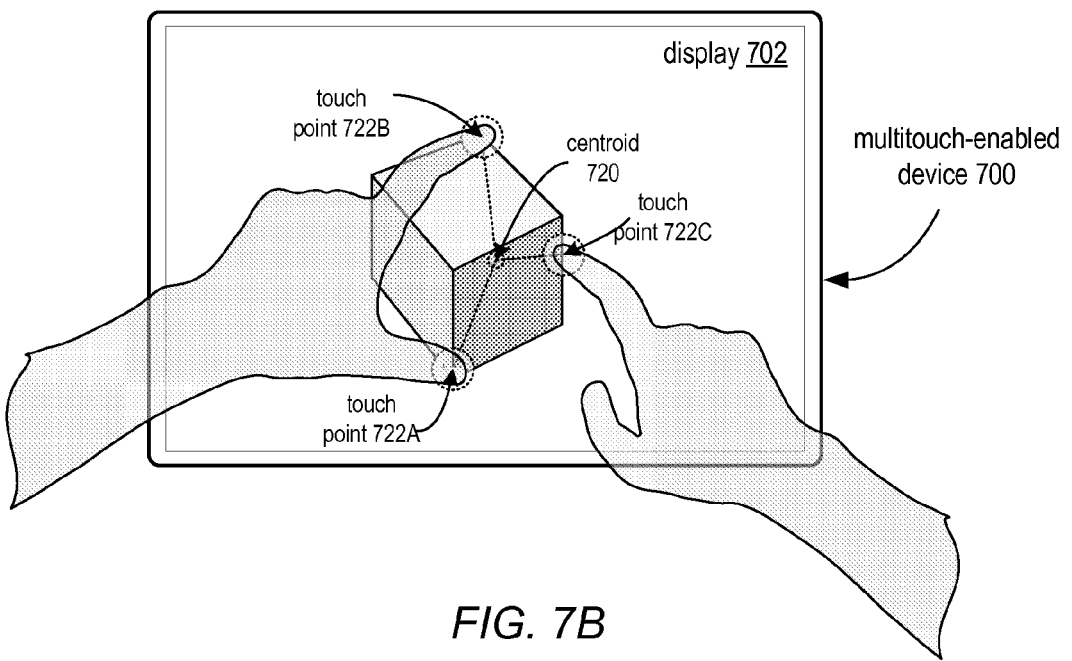

In at least some embodiments, a user may place one or more digits on the multitouch-enabled device creating one or more touch points, and subsequently place one or more additional digits on the multitouch-enabled device creating one or more additional touch points. In addition, a user may place multiple digits on the multitouch-enabled device, creating multiple touch points, and subsequently remove one or more of the digits, removing one or more touch points. Each of these actions causes displacement of the centroid from its original position to the new centroid position indicated by the touch points that are available after adding or removing one or more touch points. FIGS. 7A and 7B graphically illustrate an example in which an additional digit (and thus an additional touch point) is added using the right hand after two touch points have been indicated using the left hand, according to at least some embodiments. As shown in FIG. 7A, the user has placed two digits of the left hand on the display 702 of multitouch-enabled device 700, indicating touch points 722A and 722B. A centroid 720 of the touch points is obtained and tracked. In FIG. 7B, the user places a digit of the right hand on the display 702, indicating a new touch point 722C. A new position of centroid 720 is computed. Note that this may create a substantial displacement of the centroid. While not shown, if the user removes the additional digit that was placed in FIG. 7B, the centroid 720 is adjusted accordingly; if the other digits have not been substantially moved, the centroid 720 returns to near its original position as shown in FIG. 7A.

Embodiments may support different actions that may be performed in response to detecting the addition or removal of one or more touch points 722. In at least some embodiments, if the number of touch points 722 changes (i.e., if one or more new touch points are detected or one or more touch points are removed), rotation may be reset (e.g., by setting displacement to 0), a new centroid 720 is determined, and displacement of the centroid may be tracked from the new location of the centroid 720. This allows the user to place one or more additional digits on or remove one or more digits from the touch-sensitive surface (e.g., display 702) without causing the 3D object to rotate. This mode may be referred to as the reset rotation mode. As an alternative to the reset rotation mode, in at least some embodiments, if the number of touch points 702 changes, a new position for centroid 720 is determined, a displacement from the previous position of the centroid 720 to the new position of the centroid 720 is determined, the displacement is mapped to a rotation transformation, and the 3D object may then be rotated according to the rotation transformation. A 2D projection of the rotated 3D object is then displayed. This allows the user to place one or more additional digits on or remove one or more digits from the touch-sensitive surface (e.g., display 702) to cause a rotation of the 3D object accordingly. This technique may, for example, allow the user to toggle to different rotated views of the 3D object by placing an additional digit on the surface (e.g., display 702) and then removing the digit from the surface, each action producing a relatively large rotation, and the two actions producing rotations in the opposite direction about the same axis.

Figure 11:
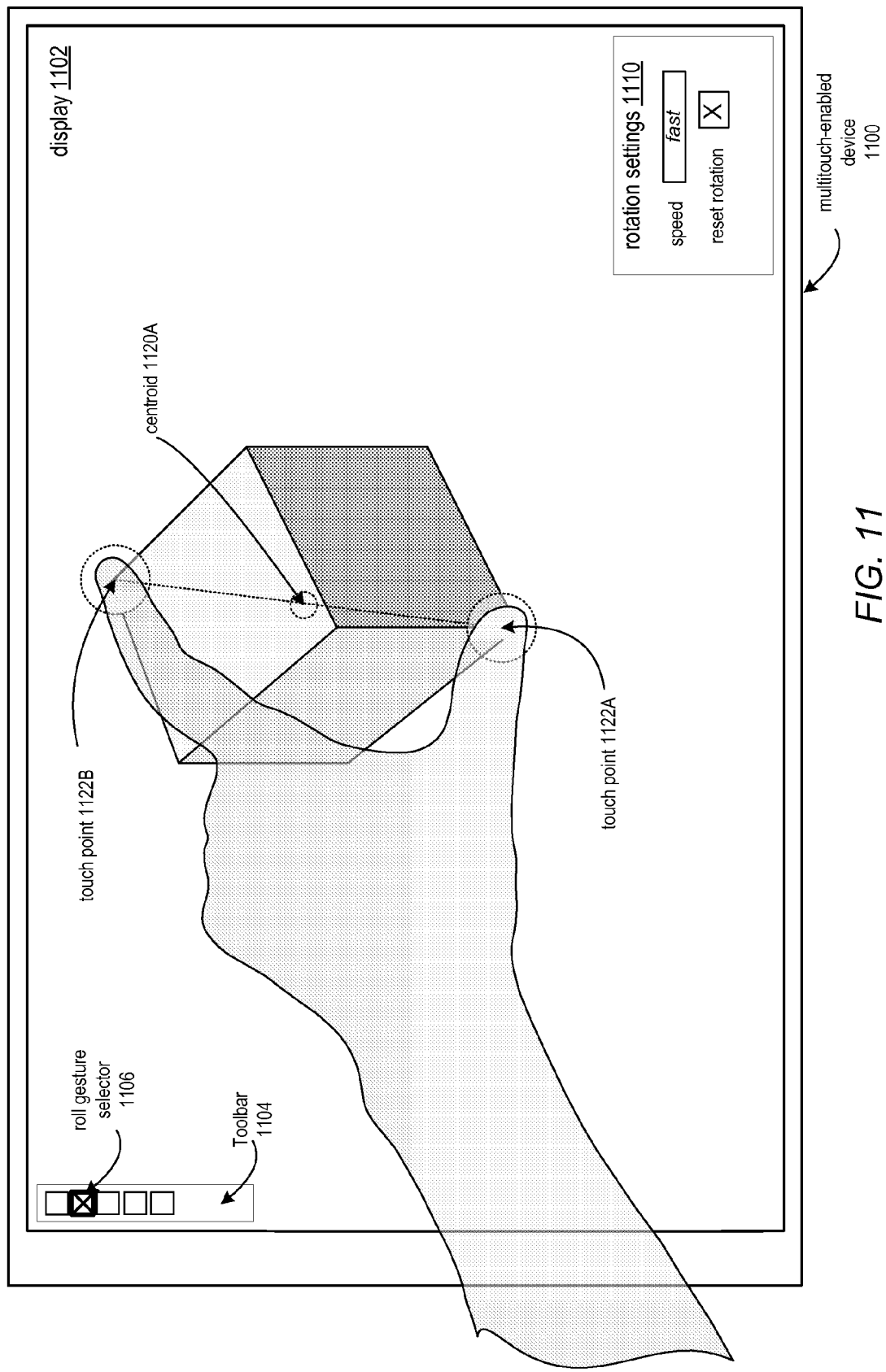
FIG. 11 illustrates an example user interface that includes a multitouch rotation tool, according to some embodiments.

In at least some embodiments, the above two modes or methods for handling addition or removal of digits from the touch-sensitive surface may be provided as user-selectable options, for example as shown by the "reset rotation" checkbox in FIG. 11.

Some multitouch devices may support proximity detection. In other words, these devices may be able to detect when an object, such as a finger or stylus, is within some threshold distance of the surface of the device without actually being in contact with the surface. At least some embodiments of the roll gesture methods as described herein, may leverage this proximity detection capability, when provided, to detect multitouch gestures, such as the selection and motion gestures described for the roll gestures, based on proximity to the surface of the multitouch device rather than, or in addition to, actual contact with the surface.

Figure 8:
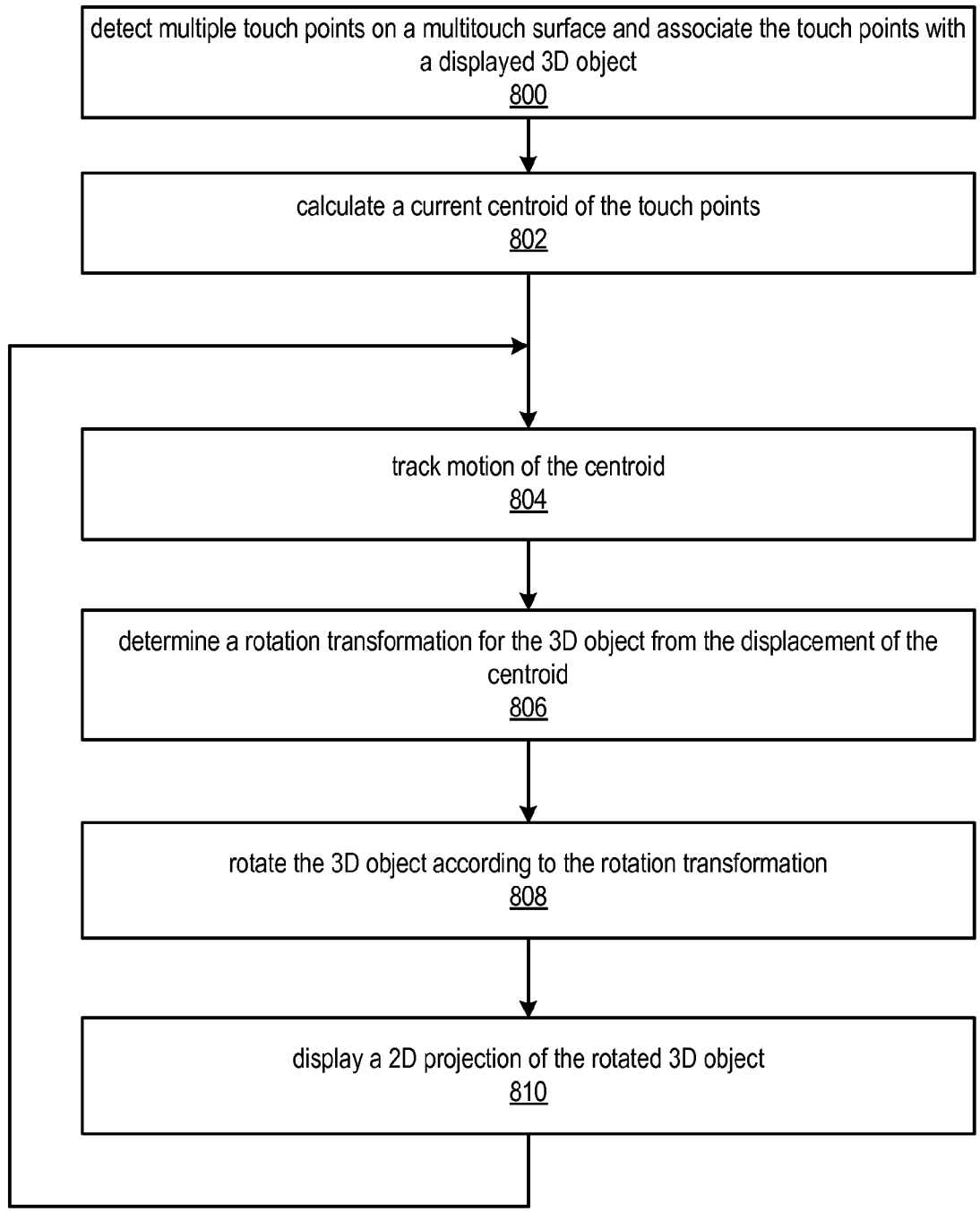
FIG. 8 is a flowchart of a roll gesture method, according to at least some embodiments.

FIG. 8 is a flowchart of a roll gesture method, according to at least some embodiments. The method may, for example, be implemented in a multitouch rotation module. An example of a multitouch rotation module is shown in FIG. 12. A system on which the method and/or the multitouch rotation module may be implemented is shown in FIG. 13. As indicated at 800, multiple touch points may be detected on a multitouch surface of a device. The touch points may correspond to or select a displayed 3D object or objects. As indicated at 802, a current centroid position of the touch points may be calculated.

As indicated at 804, motion of the centroid position may be tracked. The centroid may move, for example, in response to motion of one or more touch points, addition of one or more touch points, or removal of one or more touch points. As indicated at 806, upon detecting motion of the centroid, a rotation transformation for the associated 3D object may be determined from the displacement of the centroid. In at least some embodiments, the displacement may be a vector defined by the original position of the centroid and the detected movement, and thus may include direction and magnitude information. The displacement of the centroid is mapped to the rotation transformation. In at least some embodiments, a rotation transformation may indicate at least an axis of rotation, a direction of rotation, and an angle of rotation for the 3D object, all determined from the displacement of the centroid position. In at least some embodiments, the axis of rotation lies on the plane corresponding to the screen, and the angle of rotation indicates how far the 3D object is to be rotated about the axis in the direction of rotation. FIG. 10 graphically illustrates a rotation transformation for a 3D object relative to the display screen plane.

As indicated at 808, the associated 3D object may be rotated according to the rotation transformation. In at least some embodiments, the rotation of the 3D object may be performed by any of various rotation engines or methods. As indicated at 810, a 2D projection of the rotated 3D object may then be displayed.

Elements 804 through 810 of FIG. 8 may be iteratively performed so that the user may manipulate one or more of the digits used in the roll gesture and view real-time or near-real-time feedback of the resulting rotation on the display.

Figure 9:
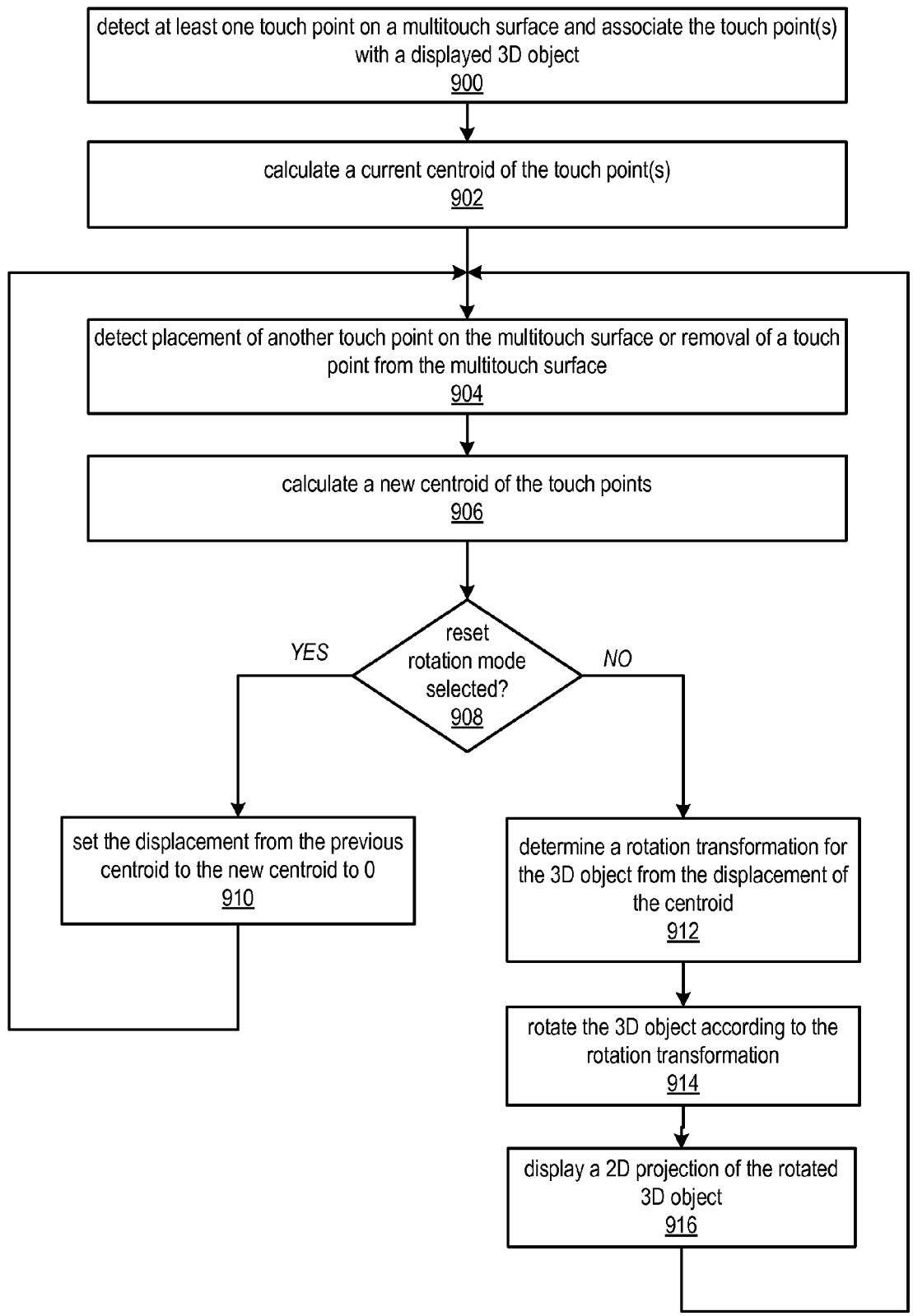
FIG. 9 is a flowchart of a roll gesture method in which touch points are added or removed, according to at least some embodiments.

FIG. 9 is a flowchart of a roll gesture method in which touch points are added or removed, according to at least some embodiments. The method may, for example, be implemented in a multitouch rotation module. An example of a multitouch rotation module is shown in FIG. 12. A system on which the method and/or the multitouch rotation module may be implemented is shown in FIG. 13.

As indicated at 900, one or more touch points may be detected on a multitouch surface of a device. The touch points may correspond to or select a displayed 3D object or objects. As indicated at 902, a current centroid position of the touch point(s) may be calculated. As indicated at 904, the method may detect placement of another touch point on the multitouch surface or removal of a touch point from the multitouch surface. As indicated at 90s, a new position for the centroid is calculated.

As previously described, embodiments may support different actions that may be performed in response to detecting the addition or removal of one or more touch points as indicated at 904. Embodiments may support one or more of these actions. The flowchart of FIG. 9 shows an embodiment that supports two modes as user-selectable options, for example as shown by the "reset rotation" checkbox in FIG. 11

At 908, if the reset rotation mode is selected, rotation may be reset (e.g., by setting displacement to 0), and displacement of the centroid may be tracked from the new position of the centroid, as indicated at 910. Thus, in reset rotation mode, touch points may be added or removed without causing the 3D object to be rotated.

At 908, if the reset rotation mode is not selected, a rotation transformation for the 3D object may be generated from the displacement of the centroid, as indicated at 912, and the 3D object may be rotated according to the rotation transformation as indicated at 914. As indicated at 915, a 2D projection of the rotated 3D object may then be displayed. This allows the user to place one or more additional digits on or remove one or more digits from the touch-sensitive surface to cause a rotation of the 3D object accordingly. This technique may, for example, allow the user to toggle to different rotated views of the 3D object by placing an additional digit on the surface and then removing the digit from the surface, each action producing a relatively large rotation, and the two actions producing rotations in the opposite direction about the same axis.

As shown by the arrows that return to element 904 from elements 910 and 916, respectively, elements 904 through 916 of FIG. 9 may be iteratively performed. In addition, the user may switch modes between gestures, and may also move one or more touch points to cause rotation as illustrated in FIG. 8.

FIG. 11 illustrates an example user interface for the roll gesture methods, according to at least some embodiments. In some embodiments, a toolbar 1104 of an application may be displayed that may include one or more user interface items from which the user may select various functions or tools of the application. For example, the toolbar 1104 may include one or more user interface elements via which the user may select or activate a roll gesture element 1106 to activate the roll gesture method as described herein from among a set of tools. Once the roll gesture method is selected, the user may place one or more touch points (e.g., touch points 1122A and 1122B) on the display 1102 relative to one or more displayed 3D objects and perform one or more of the various roll gesture techniques as described herein to rotate the 3D object(s). In some embodiments, other methods for activating the roll gesture method may be used; for example, a multitouch gesture placing two or more touch points (e.g., touch points 1122A and 1122B) on the display proximate to a displayed 3D object may activate the roll gesture method.

In some embodiments, one or more roll gesture parameters or options may be specified or selected by the user. For example, as shown in FIG. 11, a rotation settings 1110 area may be displayed that may include alphanumeric entry boxes, slider bars, dials, check boxes, popup menus, or other user interface elements via which a user may specify or select various roll gesture parameters and options. This example of rotation settings 1110 shows a speed parameter that may, for example, be set to slow, medium, or fast (shown currently set to fast). The speed parameter may be used to adjust how far a selected 3D object is rotated relative to the displacement of the centroid. Note that the speed parameter may be set to discrete parameters, for example using a popup menu as illustrated, or may be set continuously over a range, for example using a slider bar. In addition, this example of rotation settings 1110 shows a check box via which a user may select or deselect the reset rotation mode for handling the addition or removal of touch points from the touch-enabled surface. If reset rotation is set, then adding or removing a touch point moves the centroid and continues tracking but does not rotate the object. If reset rotation is not set, then adding or removing a touch point moves the centroid and rotates the 3D object according to the displacement from the previous centroid position to the new centroid position.

Example Implementations

Some embodiments may include a means for performing a roll gesture as described herein. For example, a multitouch rotation module may receive input identifying multiple touch points relative to a displayed 3D object or objects, compute a centroid position for the touch points, detect movement of the touch points, track the position of the centroid, detect addition or removal of touch points, and rotate the 3D object(s) according to displacement of the tracked centroid as described herein. The multitouch rotation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying multiple touch points relative to a displayed 3D object or objects, computing and tracking a centroid position for the touch points, detecting addition or removal of touch points, and rotating the 3D object(s) according to displacement of the tracked centroid as described herein. Other embodiments of the multitouch rotation module may be at least partially implemented by hardware circuitry and/or firmware stored, for example, in a non-volatile memory.

FIG. 12 illustrates a multitouch rotation module that may implement one or more of the multitouch roll gesture methods illustrated in FIGS. 1A through 11. In at least some embodiments, module 1220 may, for example, implement a centroid tracking component and a rotation component 1226. FIG. 13 illustrates an example computer system on which embodiments of module 1220 may be implemented. Module 1220 receives as input one or 3D objects 1210. Module 1220 may receive user input 1212 specifying two or more touch points, and may also receive user input that adds or removes one or more touch points. Module 1220 may compute and track a centroid for the touch points, and rotate the 3D object(s) according to the displacement of the centroid. In at least some embodiments, the rotation may be applied according to one or more user-specified options and parameters as illustrated in FIG. 11. Module 1220 generates as output the one or more 3D objects 1210, which may have been rotated according to the user input. Output 3D objects 1210 may be displayed to display 1250, or may be further manipulated using the roll gestures implemented via module 1220. In at least some embodiments, output 3D objects 1210 may, for example, be stored to a storage medium 1240, such as system memory, a disk drive, DVD, CD, etc, and/or passed to one or more other modules 1260 for additional processing.

Example System

Embodiments of a multitouch rotation module and/or of the various multitouch roll gesture method and techniques as described herein may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, a pad or notepad-type device, an e-book, a cell phone or smart phone, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, display(s) 1380, and multitouch-enabled device(s) 1390. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by one or more processors 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a multitouch rotation module are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor(s) 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor(s) 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor(s) 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of a multitouch rotation module as described herein, and data storage 1335, comprising various data accessible by program instructions 1325. In one embodiment, program instructions 1325 may include software elements of embodiments of a multitouch rotation module as illustrated in the above Figures. Data storage 1335 may include data that may be used in embodiments. In other embodiments, other or different software elements and data may be included.

Those skilled in the art will appreciate that computer system 1300 is merely illustrative and is not intended to limit the scope of a multitouch rotation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   tracking motion of a centroid of multiple touch points on a touch-sensitive surface of a multitouch-enabled device relative to a two-dimensional (2D) projection of a three-dimensional (3D) digital object displayed on a display, the centroid indicating a mean position of the multiple touch points on a plane corresponding to the 2D projection on the display;
   responsive to movement of at least one of the multiple touch points on the touch sensitive surface, calculating a displacement of the centroid;

determining a rotation transformation for the 3D digital object from the displacement of the centroid, the rotation transformation indicating, when two touch points are detected on the surface and one of the two touch points is moved toward or away from the other touch point, that a direction of rotation corresponds to a direction the one of the two touch points moved;

rotating the 3D digital object according to the rotation transformation; and displaying a 2D projection of the rotated 3D digital object on the display.

2. The method as recited in claim 1, wherein the rotation transformation indicates an axis of rotation, the direction of rotation, and an angle of rotation for the 3D digital object, wherein the axis of rotation is on the plane corresponding to the 2D projection, and wherein the 3D digital object is rotated about the axis of rotation in the direction of rotation by an amount indicated by the angle of rotation.

3. The method as recited in claim 1, wherein determining the rotation transformation for the 3D object from the displacement of the centroid comprises:

determining an axis of rotation for the 3D digital object from the displacement of the centroid, wherein the axis of rotation is on the plane corresponding to the 2D projection;

determining the direction of rotation for the 3D digital object from a direction of the displacement on the plane corresponding to the 2D projection; and determining an angle of rotation for the 3D digital object from a length of the displacement on the plane corresponding to the 2D projection.

4. The method as recited in claim 3, wherein said rotating the 3D digital object according to the rotation transformation comprises rotating the 3D digital object about the axis of rotation by an amount indicated by the angle of rotation in the direction of rotation.

5. The method as recited in claim 3, wherein the axis of rotation is substantially perpendicular to the direction of the displacement of the centroid.

6. The method as recited in claim 3, wherein the axis of rotation passes through a center of the 3D digital object.

7. The method as recited in claim 1, further comprising:

obtaining an indication of at least one additional touch point on the touch-sensitive surface; and in response to obtaining the indication of the at least one additional touch point:

determining displacement from a previous centroid to a new centroid of the multiple touch points and the at least one additional touch point;

determining a rotation transformation for the 3D digital object from the determined displacement;

rotating the 3D digital object according to the rotation transformation; and displaying a 2D projection of the rotated 3D digital object on the display.

8. The method as recited in claim 1, further comprising:

obtaining an indication of removal of at least one touch point from the touch-sensitive surface; and in response to obtaining the indication of removal of the at least one touch point:

determining displacement from a previous centroid to a new centroid of remaining touch points;

determining a rotation transformation for the 3D digital object from the determined displacement;

rotating the 3D digital object according to the rotation transformation; and displaying a 2D projection of the rotated 3D digital object on the display.

9. The method as recited in claim 1, further comprising, in response to obtaining an indication of at least one additional touch point on the touch-sensitive surface or an indication of removal of at least one touch point from the touch-sensitive surface, calculating a new position for the centroid of said touch points without determining a displacement of the centroid and without rotating the 3D digital object.

10. The method as recited in claim 1, further comprising iteratively performing tracking the motion of the centroid, calculating the displacement of the centroid, determining the rotation transformation for the 3D digital object from the displacement of the centroid, rotating the 3D digital object according to the rotation transformation, and displaying the 2D projection of the rotated 3D digital object on the display.

11. A system, comprising:

at least one processor;

a display device;

a touch-sensitive surface operable to recognize and track multiple substantially simultaneous touch points on or proximate to the surface; and a memory comprising program instructions, wherein the program instructions are executable by the at least one processor to perform operations comprising:

tracking motion of a centroid of multiple touch points on the surface relative to a two-dimensional (2D) representation of a three-dimensional (3D) digital object on the display device, the centroid indicating a mean position of the multiple touch points on a plane corresponding to 2D representation on the display device;

responsive to movement of at least one of the multiple touch points on the touch sensitive surface, calculating a displacement of the centroid;

determining a rotation transformation for the 3D digital object from the displacement of the centroid, the rotation transformation indicating, when two touch points are detected on the surface and one of the two touch points is moved toward or away from the other touch point, that a direction of rotation corresponds to a direction the one of the two touch points moved;

rotating the 3D digital object according to the rotation transformation; and displaying a 2D representation of the rotated 3D digital object on the display device.

12. The system as recited in claim 11, wherein determining the rotation transformation for the 3D object from the displacement of the centroid includes:

determining an axis of rotation for the 3D digital object from the displacement of the centroid, wherein the axis of rotation is on the plane corresponding to the 2D representation;

determining the direction of rotation for the 3D digital object from a direction of the displacement; and determining an angle of rotation for the 3D digital object from a length of the displacement.

13. The system as recited in claim 12, wherein rotating the 3D digital object according to the rotation transformation includes rotating the 3D digital object about the axis of rotation by an amount indicated by the angle of rotation in the direction of rotation, wherein the axis of rotation is perpendicular to the direction of the displacement of the centroid.

14. The system as recited in claim 11, wherein the operations further comprise:

obtaining an indication of at least one additional touch point on the touch-sensitive surface or removal of at least one touch point from the touch-sensitive surface; and in response to obtaining the indication of at least one additional touch point on the touch-sensitive surface or removal of at least one touch point from the touch-sensitive surface:

determining displacement from a previous centroid to a new centroid of said touch points;

determining a rotation transformation for the 3D digital object from the determined displacement;

rotating the 3D digital object according to the rotation transformation; and displaying a 2D representation of the rotated 3D digital object on the display device.

15. The system as recited in claim 11, wherein the operations further comprise:

obtaining an indication of at least one additional touch point on the touch-sensitive surface or removal of at least one touch point from the touch-sensitive surface; and in response to obtaining the indication of at least one additional touch point on the touch-sensitive surface or removal of at least one touch point from the touch-sensitive surface, calculating a new position for the centroid of said touch points without determining a displacement of the centroid and without rotating the 3D digital object.

16. A computer-readable storage device storing program instructions that are executable by a computing device to perform operations comprising:

tracking motion of a centroid of two or more touch points on a touch-sensitive surface relative to a two-dimensional (2D) projection of a three-dimensional (3D) digital object displayed on a display, the centroid indicating a mean position of the two or more touch points on a plane corresponding to the 2D projection on the display;

responsive to movement of at least one of the two or more touch points on the touch sensitive surface, calculating a displacement of the centroid;

determining a rotation transformation for the 3D digital object from the displacement of the centroid, the rotation transformation indicating, when two touch points are detected on the surface and one of the two touch points is moved toward or away from the other touch point, that a direction of rotation corresponds to a direction the one of the two touch points moved;

rotating the 3D digital object according to the rotation transformation; and displaying a 2D projection of the rotated 3D digital object on the display.

17. The computer-readable storage device as recited in claim 16, wherein the rotation transformation indicates an axis of rotation, the direction of rotation, and an angle of rotation for the 3D digital object, wherein the axis of rotation is on the plane corresponding to the 2D projection, and wherein rotating the 3D digital object according to the rotation transformation includes rotating the 3D digital object about the axis of rotation in the direction of rotation by an amount indicated by the angle of rotation.

18. The computer-readable storage device as recited in claim 17, wherein the axis of rotation is perpendicular to a direction of the displacement of the centroid.

19. The computer-readable storage device as recited in claim 16, wherein the operations further comprise:

obtaining an indication of at least one additional touch point on the touch-sensitive surface; and in response to said obtaining the indication of at least one additional touch point on the touch-sensitive surface:

determining displacement from a previous centroid to a new centroid of the two or more touch points and the at least one additional touch point;

determining a rotation transformation for the 3D digital object from the determined displacement;

rotating the 3D digital object according to the rotation transformation; and displaying a 2D representation of the rotated 3D digital object on the display.

20. The computer-readable storage device as recited in claim 16, wherein the operations further comprise:

obtaining an indication of at least one additional touch point on the touch-sensitive surface; and in response to said obtaining the indication of at least one additional touch point on the touch-sensitive surface, calculating a new position for the centroid of the two or more touch points and the at least one additional touch point without determining a displacement of the centroid and without rotating the 3D digital object.

* * * * *